(12) United States Patent
Costa

(10) Patent No.: US 7,318,502 B2
(45) Date of Patent: Jan. 15, 2008

(54) FLUID PASSAGE LAYOUT FOR INTEGRATED MOTORCYCLE BRAKE AND SUSPENSION SYSTEM

(76) Inventor: Vincenzo F. Costa, 15572 Computer La., Huntington Beach, CA (US) 92649

( * ) Notice: Subject to any disclaimer, the term of this patent is extended or adjusted under 35 U.S.C. 154(b) by 10 days.

(21) Appl. No.: 11/225,475

(22) Filed: Sep. 13, 2005

(65) Prior Publication Data
US 2006/0185942 A1 Aug. 24, 2006

Related U.S. Application Data

(63) Continuation-in-part of application No. 11/062,196, filed on Feb. 18, 2005.

(51) Int. Cl.
*B62L 5/00* (2006.01)
(52) U.S. Cl. ............... 188/24.22; 188/26; 188/72.4; 188/344
(58) Field of Classification Search ............ 188/24.22, 188/72.4, 73.1, 344, 26, 251 M; 303/137, 303/9.64; 280/264, 276
See application file for complete search history.

(56) References Cited

U.S. PATENT DOCUMENTS

| 4,049,090 | A | * | 9/1977 | Buell | ............... | 188/251 M |
| 4,494,630 | A | * | 1/1985 | Stoka et al. | ............... | 188/71.8 |
| 4,620,617 | A | * | 11/1986 | Weber | ............... | 188/196 BA |
| 5,186,274 | A | * | 2/1993 | Hegman | ............... | 180/227 |
| 5,826,463 | A | * | 10/1998 | Monson | ............... | 74/512 |
| 6,085,398 | A | * | 7/2000 | Arch | ............... | 29/239 |
| 6,308,806 | B1 | * | 10/2001 | Nielsen | ............... | 188/24.11 |
| 6,401,882 | B1 | * | 6/2002 | Ueda et al. | ............... | 188/264 G |
| 6,688,440 | B2 | * | 2/2004 | Matsushita et al. | ............... | 188/344 |
| 2003/0132048 | A1 | * | 7/2003 | Hata | ............... | 180/219 |
| 2004/0010915 | A1 | * | 1/2004 | Mazur et al. | ............... | 29/894.3 |
| 2005/0115780 | A1 | * | 6/2005 | Nanri | ............... | 188/73.46 |

* cited by examiner

*Primary Examiner*—Robert A. Siconolfi
*Assistant Examiner*—James K. Hsiao
(74) *Attorney, Agent, or Firm*—Clement Cheng, Esq.

(57) ABSTRACT

An integrated motorcycle brake system has a brake line, and an inside brake assembly having an inside piston. The brake line connects to the inside brake assembly, and the inside brake assembly integrally forms a fork leg. The outside brake assembly has an outside piston opposite the inside piston. A fluid passage between the outside brake assembly and inside brake assembly has a conduit that transmits brake line pressure to the inside and outside pistons. The four way fluid junction has a vertical bore meeting a horizontal bore where the vertical bore is plugged at a top end with a seal.

26 Claims, 2 Drawing Sheets

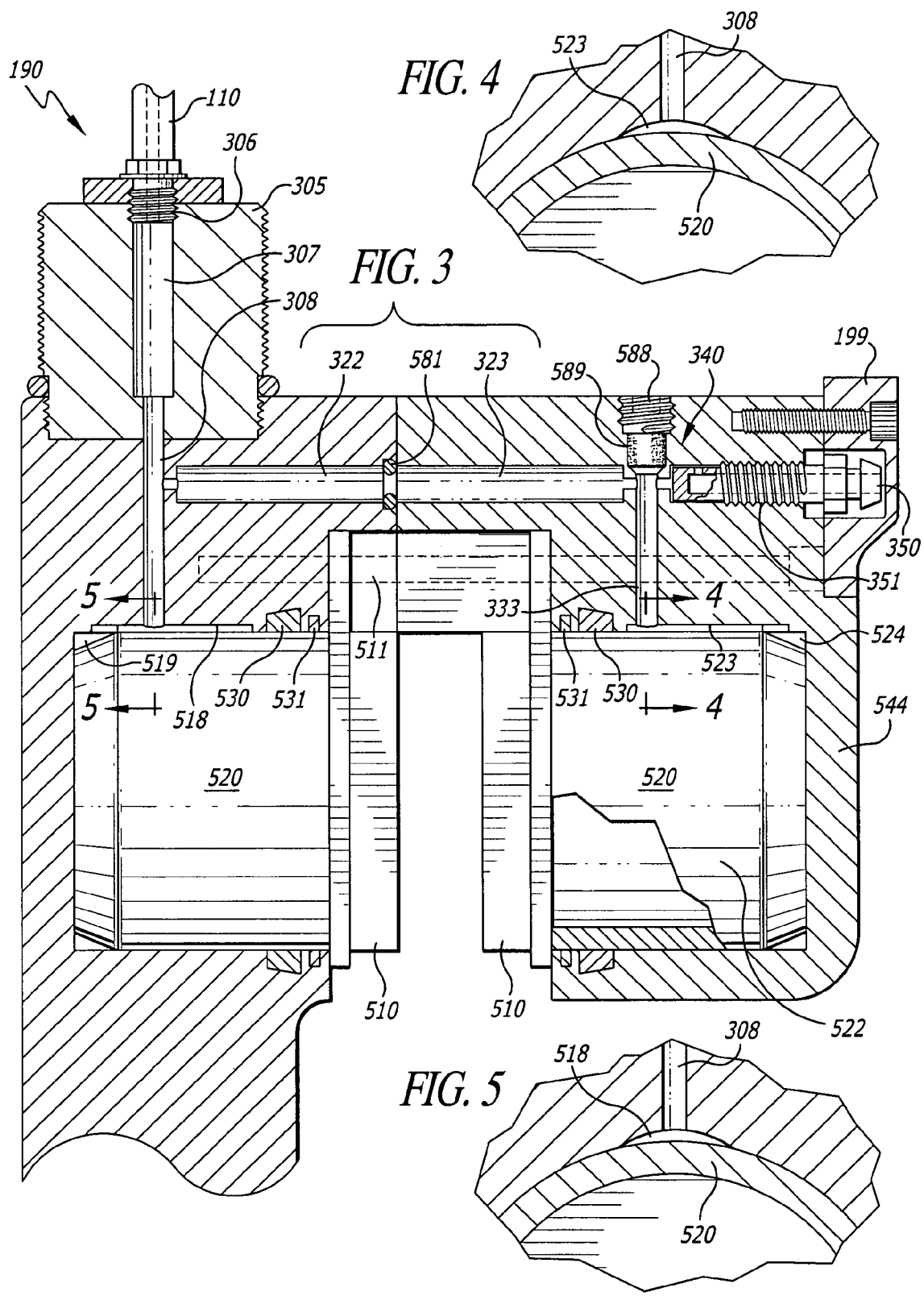

FLUID PASSAGE LAYOUT FOR INTEGRATED MOTORCYCLE BRAKE AND SUSPENSION SYSTEM

This application is a continuation in part of inventor Costa application Ser. No. 11/062,196 filed Feb. 18, 2005 titled integrated motorcycle brake and suspension system.

DISCUSSION OF RELATED ART

Traditionally, motorcycle front fork components such as brake calipers have been mounted to the exterior of the motorcycle fork frame. This allows easier maintenance and replacement of components such as brakes. Unfortunately, it also allows dust and other foreign objects to interact with the components. Shielding can also be added on exterior brake lines and components, unfortunately this adds additional complexity and cost.

Brake components are typically manufactured in an external configuration where external tubes interconnect various interconnected external brake components to form a brake system. The brake system on a motorcycle is typically amounted to the outside of a fork leg and adjustable up and down the leg. The external configuration allows modular assembly. An external configuration also provides generous air flow interaction between components and ambient air.

BRIEF DESCRIPTION OF THE DRAWINGS

FIG. 3 is a cross sectional view of the brake assembly showing the fluid passage layout.

FIG. 4 is a cross sectional view of the outer brake piston.

FIG. 5 is cross sectional view of the inner brake piston.

DETAILED DESCRIPTION OF THE PREFERRED EMBODIMENT

Figures 1, 2:
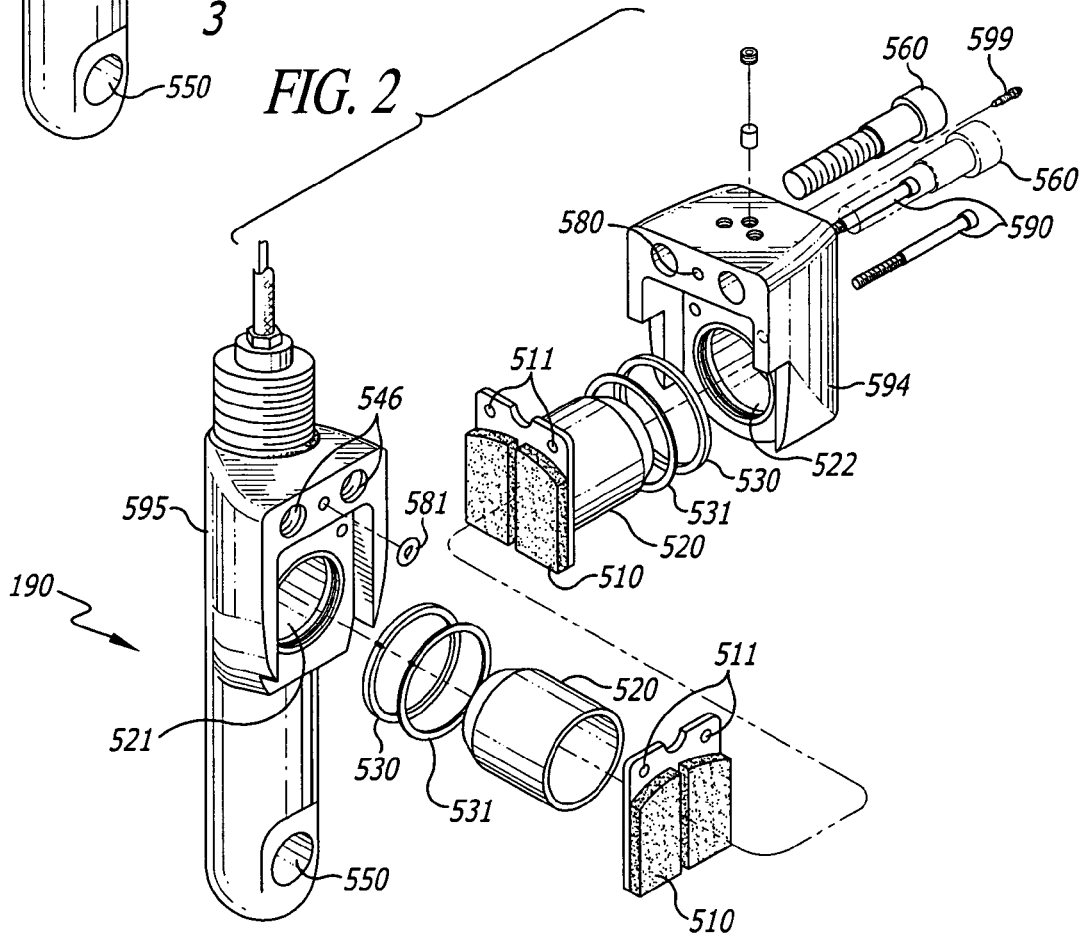
FIG. 1 is an exploded view of the caliper leg of the invention.
FIG. 2 is an exploded view of the brake assembly.

The present invention is an integrated motorcycle brake system where the fluid passage of the brake system resides internally within components of a fork leg. Two members form a pair of suspension members forming the fork. The suspension members are similar in operation, and physical components. The brake caliper leg has an internal brake line and an integrated brake.

The fork leg having an integral brake assembly is considered integrally formed because the brake structure such as the area around inside caliper piston chamber 521 has load bearing capability. The term 'inside' used above describes the relative position of the caliper piston and does not mean 'encapsulated'.

Preferably, the integral formation has both the fork leg and inside caliper brake assembly made of the same piece of metal, which is the best mode. The suspension system of the brake caliper leg has a variety of springs to control shock and motion. The other support and suspension member being the opposite fork leg is not shown because it is an ordinary leg that opposes the caliper leg to hold a motorcycle wheel.

The brake line 110, FIG. 1 runs from a manual brake actuator control to the caliper brake leg. The brake line has dynamically varying hydraulic pressure, and is typically filled with oil. The brake line terminates at the disk brake assembly 190. The disk brake has a pair of brake pads 510 biased together by a pair of brake pistons 520. Brake pistons 520 are sealed with o-ring seals 530. Commonly, the seals have wipers 531 preventing dust and small particles from contaminating the seals 530. The seals maintain hydraulic pressure, transmitting the brake line pressure against the pistons 520 that transmit pressure against the brake pads 510 that transmit pressure against the disk portion of a wheel. The wheel is mounted on the wheel axis shown as aperture 550.

The disk brake assembly 190 is formed of an inside brake assembly 545 and the outside brake assembly 544. Each brake assembly has fluid passages providing hydraulic pressure to their respective brake pistons. Brake line fluid passages are integrally formed within the inside and outside brake assembly preferably by drilling fluid passages through a solid section of metal such as aluminum forming the inside and outside brake assembly. The disk brake assembly 190 includes a pair of bolts 560 that are partially threaded and secure the outside brake assembly 544 against the inside brake assembly 545. The bolts 560 secure into threads 546. The brake line hydraulic pressure is transmitted from the inside brake assembly 545 the outside brake assembly 544 via a conduit 580.

A seal 581 formed as a gasket or o-ring seals the conduit at an interface. The interface between the inside brake assembly 545 the outside brake assembly 544 is preferably a flat surface and should also have an indentation capable of receiving the seal 581. The indentation or groove is milled on the inside surface of either the inside brake assembly 545 as shown in FIG. 3, or on the outside brake assembly 544.

The inside piston aperture 521 opposes the outside piston aperture 522. Preferably, a pair of brake pad bolts 590 having a smooth and threaded section secure through the outside brake assembly 544 and pass through the brake pads 510 at brake pad guide points 511, and secure into threads in the inside brake assembly 545. The brake pad bolts allow brake pad lateral movement. Brake pads are automatically aligned upon engagement of the brake. The distance between the brake pads is 0.4 to 0.6 inch and the rotor has a width of 0.18 to 0.25 inch. Preferably, a bleeder cap 599 will allow drainage of the hydraulic fluid, such as oil or water.

A fender mount also called a fender bracket 198 is attached to the disk brake assembly 190 integral to the lower leg 190 allowing a fender to be mounted to the motorcycle. The fender mount 198 is preferably secured to the disk brake assembly by four machine screws that are seen in figure one as attaching to the top of the outside brake assembly 544. A faceplate also called a tombstone 199 allows a cleaner look and keeps dust out by covering the various apertures and bolt head formed by the bolts 590, 560. The fender generally mounts on the pair of horizontal extending apertures formed on the fender bracket 198. A fender is a guard over a wheel of a motor vehicle that is shaped and positioned to block the splashing of water or mud.

The inside piston assembly is integrally formed to the caliper leg of the fork. Here, the inside piston assembly is made of the same piece of metal that supports the fork. An axle is held between the pair of fork legs. After the device is filled with oil, it can be mounted on the motorcycle so that it receives a brake rotor between the brake pads.

FIG. 3 shows the cross section view of the fluid passage layout. The hydraulic brake fluid is preferably oil but can also be water based. The brake line 110 appears at the top of the caliper. The brake line attaches by a brake line threaded connection 306 to the caliper leg 190 at a top structural end member 305 having a fluid passage bored through the top structural end member 305. The fluid passage continues downward preferably in coaxial orientation to the brake line threaded connection 306 and top structural end member fluid passage 307. The vertical continuation 308 of the fluid passage to the inside piston chamber has a preferably smaller diameter and cross section. The fluid passage vertical continuation 308 merges with an inside piston oil chamber 518. The oil chamber preferably starts at an arc shaped depression formed in the otherwise circular inside piston chamber wall profile. The inside piston subtending the arc shape allows a length of an oil chamber. The inside piston oil chamber 518 is in fluid communication with the base of the piston shown as chamfered or beveled providing an annular oil chamber cavity at the base of the piston. The piston receives the oil pressure and reacts with displacement pressing the inside brake pad against the brake rotor. Chamfer in this context means to cut off the edge or corner of and is synonymous to the word bevel. The interfaces between the fluid passages can be chamfered or beveled in a first kind of embodiment or have a right angle interface as a second kind of embodiment.

At the vertical continuation 308, a horizontal inside caliper fluid passage 322 provides fluid passage and fluid pressure to the outside caliper member also called the outside brake assembly 544. A seal 581 seals the horizontal fluid passage 322 at the interface between the inside caliper section also called the inside brake assembly 545 and the outside caliper section also called the outside brake assembly 544.

The horizontal fluid passage 322 continues to the outside caliper horizontal fluid passage 323. The outside caliper horizontal fluid passage 323 meets a fluid junction. The four way fluid junction 340 has a vertical bore meeting a horizontal bore where the vertical bore is plugged at a top end with a seal 589. The outside caliper horizontal fluid passage 323 is preferably coaxial to a bleeder opening 350 that acts as a valve so that it can be manipulated to allow draining of the oil system. The oil system drains through the bleeder screw 351 that is engaged into a threaded bore. The bleeder screw 351 can be implemented so that the end of the tap seals against a seat. The seat can have a right angle profile or a forty-five degree angle profile. When the tap is turned, the oil escapes and exits through bleeder opening 350.

The vertical bore is machined from the top of the outside caliper member 454 as a single vertical bore through solid metal which is then capped above the fluid junction. The drill cap 588 is threaded to the outside caliper member 544 and has a seal 589 below. Below the cap, the outside caliper member vertical fluid passage 333 provides a hydraulic pressure to the outside piston oil chamber.

The outside piston oil chamber 523 is symmetrical and a mirror image of inside piston oil chamber 518. The outside piston oil chamber 523 is formed as an arc shaped slot in the upper sidewall of the outside piston chamber 522 so that it is in fluid communication with the outside annular base chamber 524 providing oil pressure to the outside piston 520 so that when oil pressure increases in the brake line 110, the oil pressure is transmitted throughout the fluid passage to the pistons 520 pressing the pistons 520 against the brake rotor.

An alternate embodiment of the fluid passage layout omits the continuation of the horizontal fluid passage 322 to the bleeder opening 350 so that the horizontal bore ends at the vertical bore. The outside caliper horizontal fluid passage 323 meets at a T or 3 way fluid junction and the bleeder opening 350 is mounted on the drill cap 588 in a vertical position rather than a horizontal position. The area previously taken by the bleeder screw 351 is preferably solid material. The alternate embodiment is not preferred, but saves the extra bore drill required to create the aperture taken by the bleeder screw 351. The manufacturing process requires only the horizontal drill for opening conduit 323 to the extent of the vertical drilled bore creating conduit 333. Again, here the fluid passage connects the brake line to the inside and outside pistons so that pressure from the brake line, or lack of pressure is transmitted from the brake line to the pistons and then from the pistons to the brake pads so that brake pads move to press against the rotor.

Although the fluid passages are shown on rectangular coordinates as drilled conduits having rectangular right angle junctions, non-rectangular junctions at various angles can also be formed so as to provide basically the same functionality. For example, although the horizontally drilled conduit between the inside brake assembly and outside brake assembly is shown as horizontal, it can also be basically horizontal or at an angle. Accordingly, it is not intended that the invention be limited, except as by the appended claims.

The invention claimed is:

1. A motorcycle brake system comprising:
a motorcycle fork having a first leg, and a second leg;
an inside brake assembly having an inside piston, wherein the inside brake assembly integrally forms the fork leg, wherein the inside brake assembly and motorcycle fork leg are and configured to provide vehicular support, wherein the inside brake assembly is integrally formed with the first leg;
an outside brake assembly opposite the inside brake assembly, wherein the outside brake assembly is attached to the first leg;
a brake line;
wherein the brake line connects to the inside brake assembly by a brake line threaded connection at an externally threaded cylindrically shaped top structural end member having a bored top structural end member fluid passage connecting to a vertical continuation, wherein the bored top structural end member fluid passage and vertical continuation hydraulically connect to the brake line, wherein the externally threaded cylindrically shaped top structural end member is connected to a top portion of the first leg.

2. The motorcycle brake system of claim 1, further comprising a fluid passage integrally formed within the inside brake assembly and outside brake assembly, wherein the fluid passage connects between an inside piston and an outside piston.

3. The motorcycle brake system of claim 1, further comprising a brake line and a fluid passage integrally formed within the inside brake assembly and outside brake assembly, wherein the fluid passage connects a brake line to an inside and an outside piston.

4. The motorcycle brake system of claim 1, further comprising a drill cap having a seal covering the outside portion of an outside caliper member fluid passage.

5. The motorcycle brake system of claim 4, wherein the seal comprises a bleeder opening, wherein said bleeder opening is horizontal and has a bleeder cover.

6. The motorcycle brake system of claim 1, further comprising a brake pad bolt constraining brake pads to linear motion, wherein brake pads are mounted between the inside piston and the outside piston and automatically aligned upon engagement of the brake.

7. The motorcycle brake system of claim 6, wherein the distance between the brake pads is 0.4 to 0.6 inch and the rotor has a width of 0.18 to 0.25 inch.

8. The motorcycle brake system of claim 1, wherein the inside brake assembly has a vertical fluid passage extending from the brake line to an oil chamber of the inside piston.

9. The motorcycle brake system of claim 1, further comprising a fender bracket mounted to a top surface of the outside brake assembly, which houses the outside caliper piston.

10. The motorcycle brake system of claim 1, wherein the inside brake assembly further comprises a vertical internal fluid passage formed from drilling a solid section of metal, wherein the vertical internal fluid passage extends from the brake line to an oil chamber of the inside piston.

11. A motorcycle brake system comprising:
a motorcycle fork having a first leg, and a second leg;
a brake line;
an inside brake assembly having an inside piston, wherein the brake line connects to the inside brake assembly by a brake line threaded connection at an externally threaded cylindrically shaped top structural end member having a bored top structural end member fluid passage connecting to a vertical continuation, wherein the bored top structural end member fluid passage and vertical continuation hydraulically connect to the brake line, wherein the externally threaded cylindrically shaped top structural end member is connected to a top portion of the first leg, and wherein the inside brake assembly integrally forms the fork leg, wherein the inside brake assembly and motorcycle fork leg are configured to provide vehicular support, wherein the inside brake assembly is integrally formed with the first leg;
an outside brake assembly having an outside piston opposite the inside piston, an outside brake assembly opposite the inside brake assembly, wherein the outside brake assembly is attached to the first leg;
a fluid passage internally formed within the outside brake assembly and inside brake assembly, wherein the fluid passage passes between the outside brake assembly and inside brake assembly; wherein the fluid passage forms a four way fluid junction in the outside brake assembly with a vertical bore meeting a horizontal bore wherein the vertical bore is plugged at a top end with a seal.

12. The motorcycle brake system of claim 11, further comprising a drill cap having a seal covering the outside portion of an outside caliper member fluid passage.

13. The motorcycle brake system of claim 12, wherein the seal comprises a bleeder opening, wherein said bleeder opening is horizontal and has a bleeder cover.

14. The motorcycle brake system of claim 11, further comprising a brake pad bolt constraining brake pads to linear motion, wherein brake pads are mounted between the inside piston and the outside piston and automatically aligned upon engagement of the brake.

15. The motorcycle brake system of claim 14, wherein the distance between the brake pads is 0.4 to 0.6 inch and the rotor has a width of 0.18 to 0.25 inch.

16. The motorcycle brake system of claim 11, wherein the inside brake assembly has a vertical fluid passage extending from the brake line to an oil chamber of the inside piston.

17. The motorcycle brake system of claim 11, further comprising a fender bracket mounted to the outside brake assembly.

18. The motorcycle brake system of claim 11, wherein the inside brake assembly further comprises a vertical internal fluid passage formed from drilling a solid section of metal, wherein the vertical internal fluid passage extends from the brake line to an oil chamber of the inside piston.

19. A motorcycle brake system comprising:
a motorcycle fork having a first leg, and a second leg;
a brake line;
an inside brake assembly having an inside piston, wherein the brake line connects to the inside brake assembly by a brake line threaded connection at an externally threaded cylindrically shaved top structural end member having a bored top structural end member fluid passage connecting to a vertical continuation, wherein the bored top structural end member fluid passage and vertical continuation hydraulically connect to the brake line, wherein the externally threaded cylindrically shaped top structural end member is connected to a top portion of the first leg, and wherein the inside brake assembly integrally forms the fork leg, wherein the inside brake assembly and motorcycle fork leg are configured to provide vehicular support, wherein the inside brake assembly is integrally formed with the first leg;
an outside brake assembly having an outside piston opposite the inside piston;
a fluid passage internally formed within the outside brake assembly and inside brake assembly, wherein the outside brake assembly is attached to the first leg, wherein the fluid passage passes between the outside brake assembly and inside brake assembly;
wherein the fluid passage forms a three way fluid junction in the outside brake assembly with a horizontal bore ending at a vertical bore.

20. The motorcycle brake system of claim 19, further comprising a drill cap having a seal covering the outside portion of an outside caliper member fluid passage.

21. The motorcycle brake system of claim 20, wherein the seal comprises a bleeder opening, wherein said bleeder opening is horizontal and has a bleeder cover.

22. The motorcycle brake system of claim 19, further comprising a brake pad bolt constraining brake pads to linear motion, wherein brake pads are mounted between the inside piston and the outside piston and automatically aligned upon engagement of the brake.

23. The motorcycle brake system of claim 22, wherein the distance between the brake pads is 0.4 to 0.6 inch and the rotor has a width of 0.18 to 0.25 inch, wherein the rotor is formed as a flat sheet of circular metal disc.

24. The motorcycle brake system of claim 19, wherein the inside brake assembly has a vertical fluid passage extending from the brake line to an oil chamber of the inside piston.

25. The motorcycle brake system of claim 19, further comprising a fender bracket mounted to a top surface of the outside brake assembly, which houses the outside caliper piston.

26. The motorcycle brake system of claim 19, wherein the inside brake assembly further comprises a vertical internal fluid passage formed from drilling a solid section of metal, wherein the vertical internal fluid passage extends from the brake line to an oil chamber of the inside piston.

* * * * *